United States Patent [19]

Weese et al.

[11] Patent Number: 4,617,329

[45] Date of Patent: Oct. 14, 1986

[54] PIGMENTED THERMOPLASTIC RESINS

[75] Inventors: Richard H. Weese, Washington Crossing, Pa.; Evan H. Crook, Cherry Hill, N.J.; Susan M. Liwak, Langhorne, Pa.

[73] Assignee: Rohm and Haas Company, Philadelphia, Pa.

[21] Appl. No.: 762,236

[22] Filed: Sep. 5, 1985

Related U.S. Application Data

[63] Continuation of Ser. No. 594,161, Mar. 30, 1984, abandoned, which is a continuation-in-part of Ser. No. 513,741, Jul. 22, 1983, abandoned.

[51] Int. Cl.$^4$ .................... C08L 67/02; C08L 69/00
[52] U.S. Cl. .................... 523/201; 524/504; 525/64; 525/67
[58] Field of Search .................... 525/64, 67; 524/504; 523/201

[56] References Cited

U.S. PATENT DOCUMENTS

| | | | |
|---|---|---|---|
| 3,218,372 | 11/1965 | Okamura | 525/67 |
| 3,661,994 | 5/1972 | Hwa | 525/71 |
| 3,793,402 | 2/1974 | Owens | 525/81 |
| 3,971,835 | 7/1976 | Myers | 525/81 |
| 4,026,970 | 5/1977 | Backdert | 525/218 |
| 4,145,380 | 3/1979 | Myers | 525/306 |
| 4,180,494 | 12/1979 | Fromuth | 525/63 |
| 4,264,487 | 4/1981 | Fromuth | 525/67 |
| 4,393,169 | 7/1983 | Moriwaki | 525/67 |

FOREIGN PATENT DOCUMENTS 53-018661 2/1978 Japan .................... 525/67

*Primary Examiner*—John C. Bleutge
*Assistant Examiner*—Patricia A. Short
*Attorney, Agent, or Firm*—Jordan J. Driks

[57] ABSTRACT

A polymer blend comprises from about 60 parts to about 99.9 parts by weight of a pigmented thermoplastic resin, which resin is a polyester or a polycarbonate or mixtures thereof, and from about 0.1 part to about 40 parts of a sequentially produced multi-stage polymer. The multi-stage polymer comprises a polymer core of at least about 10 parts, based on the weight of the multi-stage polymer. The core is polymerized from a styrenic monomer, or a mixture of styrenic monomers. The styrenic monomer of the core comprises at least about 50% by weight of said core. A second monomer may be present and a crosslinking monomer for styrene is present in said core. The second stage of the multi-stage polymer comprises a polymeric soft stage and the outer stage of the multi-stage polymer is a rigid thermoplastic.

44 Claims, No Drawings

PIGMENTED THERMOPLASTIC RESINS

This is a continuation of application Ser. No. 594,161 filed Mar. 30, 1984, now abandoned, which is in turn a continuation-in-part of application Ser. No. 513,741 filed July 22, 1983, now abandoned.

BACKGROUND OF THE INVENTION

This invention relates to pigmented thermoplastic resins. More particularly, this invention relates to pigmented polyester and/or polycarbonate resins wherein the multi-stage polymer compounded therewith provides impact resistance while improving depth of color and substantially eliminating non-uniform color appearance when the compounded pigmented polymer is molded into an article.

The impact strength of polyesters and/or polycarbonates is improved by compounding the resin with an impact modifier. However, when said compounded pigmented polyester or polycarbonate resin is molded into an article, the improvement of the impact strength is accomplished at the cost of the molded article having a non-uniform color appearance. This is often manifested by a whitesh or washed out non-uniform mother of pearl appearance (pearlescence), particularly in the area of the article which is nearest the gate or gates of the mold. Further, the visual appearance of the intensity of the color itself in the molded article also suffered and the molded article was not as pleasing to the consumer.

U.S. Pat. No. 3,971,835 is directed to an impact modifier-vinyl halide polymer composition. The impact polymer which comprises a hard first stage polymer which may be styrenic material and which may have up to 50 weight percent of a monovinylidene monomer interpolymerizable therewith. Additionally, a crosslinking agent may also be present in the first stage. The second stage is a rubbery polymer which may be a crosslinked alkyl acrylate, such as butyl acrylate. The final stage is a rigid thermoplastic polymer such as methyl methacrylate. U.S. Pat. No. 3,971,835 also teaches that pigments may be incorporated in the modifier-vinyl halide polymer system. The '835 patent does not address itself to the problem of non-uniform color appearance such as pearlescence in the molded article and further does not address itself to the problem of the intensity of color. The '835 patent deals with the problem of improving the impact resistance and clarity of a vinyl halide polymer composition.

U.S. Pat. No. 3,793,402 deals with the problem of haze level of an alkyl methacrylate polymer. The '402 patent provides an impact modifier which may have a crosslinked styrene core, an elastomeric stage and a final hard stage. The elastomeric stage may be a material such as a crosslinked alkyl acrylate and the outer stage may be an alkyl methacrylate such as methyl methacrylate. The '402 patent teaches that coloring materials may be present as part of the composition. U.S. Pat. No. 3,793,402 does not deal with the problem of pearlescence or intensity of color of a pigmented polyester and/or polycarbonate resin.

U.S. Pat. No. 3,162,695 deals with the problem of the flow characteristics of polycarbonate resins. The '695 patent is directed to a two stage graft copolymer having a core of a copolymer of butadiene and styrene and a shell of methyl methacrylate. The '695 patent does not teach the use of a pigment or coloring agent with the polycarbonate. Additionally, because butadiene is a necessary component of the polymer blend, the weatherability of the polycarbonate will be adversely affected because of the presence of butadiene in the core.

U.S. Pat. No. 3,864,428 is directed to a polyester/polycarbonate blend wherein there is present a graft copolymer of a butadiene polymer and a vinyl monomer. The vinyl monomer may be styrene. The butadiene-styrene copolymer is not crosslinked. The composition may have a coloring agent. The problem which was dealt with by the '428 patent was the problem of impact strength along with shapeability and resistance to thermal deformation and good chemical resistance. The '428 patent does not deal with the problem of pearlescence or intensity of color.

U.S. Pat. No. 3,891,719 is directed to a molding composition of a polycarbonate and a graft copolymer of styrene and acrylonitrile or an acrylic ester polymer. The problem which is dealt with by the '719 patent is the tensile strength, elongation and resistance to light and weather. This patent teaches that small amounts of butadiene-containing polymers cause changes in color under the effect of intense light and/or heat. The '719 patent teaches that pigments may be present in the thermoplastic molding composition. The graft polymers which are used in the '719 patent are all soft core containing materials such as butyl acrylate. The '719 patent does not recognize and does not deal with the problem of pearlescence and intensity of color.

U.S. Pat. No. 4,026,970 is directed to a non-pigmented polymer blend wherein a multi-stage polymer serves as a toughener for a thermoplastic resin such as a polyester or a polycarbonate. The core of the '970 multi-stage polymer contains a majority of acrylonitrile and a vinylidene monomer and a graftlinker. The vinylidene monomer may be styrene or a styrenic material. The composition of the '970 patent is a non-pigmented composition and the multi-stage polymer of the '970 patent contains, in the core, less than 50% of a styrenic material. Among the graftlinkers which the '970 patent sets forth is divinyl benzene which is one of the crosslinkers which are used in the present invention. The '970 patent does not recognize or deal with the problem of pearlescence or intensity of color.

None of the patents discussed above recognized the problem of pearlescence and intensity of color of a pigmented polyester and/or polycarbonate resin.

It is an object of this invention therefore to provide a pigmented polyester and/or polycarbonate resin compounded with an impact modifier which, when molded into an article, has good intensity of color and is non-pearlescent.

Other objects and advantages will become apparent from the following more complete description and claims.

DETAILED DESCRIPTION

Broadly, this invention contemplates a polymer blend comprising from about 60 parts to about 99.9 parts by weight of a pigmented thermoplastic resin selected from the class consisting of polyesters, polycarbonates and mixtures thereof, and from about 0.1 part to about 40 parts of a sequentially produced multi-stage polymer, said multi-stage polymer comprising;

(a) a polymer core of at least about 10 parts based on the weight of the multi-stage polymer, said core being polymerized from a styrenic monomer or a mixture of a styreneic monomer and a second monomer and wherein there is at least about 50% by weight of said styrenic monomer in said core, and a crosslinking monomer for said core;

(b) a second stage comprising a polymeric soft stage; and (c) a rigid thermoplastic outer stage.

It is surprising to find that pearlescence could be substantially eliminated and intensity of color could be improved when molding a polyester and/or polycarbonate resin which has been compounded with at least a three stage multi-stage polymer which contains a core that is predominately a crosslinked styrenic core and wherein there is a soft stage, next to the core and a final stage which is a rigid, final or outer stage.

All parts and percentages, referred to in the specification and claims, unless indicated otherwise, are by weight.

The core of the multi-stage polymer comprises at least about 10 parts by weight of the multi-stage polymer and preferably from about 10 to about 40 parts by weight The core is polymerized from a styrenic monomer or a styrenic monomer and a second monomer wherein there is at least about 50% by weight of the styrenic monomer. Preferably, the styrenic monomer used for preparing the core will comprise from about 50% to about 99.9% of the core. More preferably, the styrenic monomer comprises about 75 to about 99.9% of the core.

Although styrene is the preferred monomer when preparing the core, other styrenic monomers may also be used, either in admixture with styrene or in admixture with themselves. Among the other styrenic monomers which may be used are alpha-methylstyrene, monochlorostyrene, tertiary-butylstyrene, vinyl toluene, p-isopropyl styrene, 3,4-dimethylstyrene, p-bromostyrene, 3,4-dichlorostyrene and the like.

If desired, the core may be prepared using a non-styrenic monovinylidene comonomer (second monomer) in an amount of up to about 49% and preferably, if a comonomer is to be used to prepare the core, in an amount of from about 1% to about 20%.

Among the non-styrenic monovinylidene monomers which may be used as a comonomer with the styrenic material to prepare the core are alkyl methacrylates such as methyl methacrylate, ethyl methacrylate, butyl methacrylate, hexyl methacrylate, octyl methacrylate and the like; vinyl esters such as acrylonitrile, methacrylonitrile, and the like; acrylic acid; methacrylic acid and the like.

If an alkyl methacrylate is to be used as a comonomer in preparing the core, then such alkyl methacrylate should be one which has from 1 to about 8 carbon atoms in the alkyl portion thereof. Additionally, alkyl acrylates having from 1 to about 8 carbon atoms in the alkyl portion, may also be used. Such alkyl acrylates include methyl acrylate, ethyl acrylate, butyl acrylate and the like.

The crosslinking agent used for the styrenic core is a polyethylenically unsaturated monomer which has a plurality of addition polymerizable reactive groups all of which polymerize at substantially the same rate of reaction. The crosslinking agent may be used in an amount of from about 0.1 to about 10% based on the weight of the core and preferably, from about 0.1 to about 5% based on the weight of the core.

Among the polyethylenically unsaturated monomers which may be used as the crosslinking agent for the core are polyvinyl benzene, divinyl esters of di- or tribasic acids; dialkyl esters of poly functional acids; dialkyl esters of poly functional acids; diallyl esters of poly functional acids; divinyl esters of polyhhydric alcohols; di- or tri-methacrylic acid esters of polyhydric alcohols; and mixtures thereof and the like.

Among the crosslinkers which may be used for the core are divinyl adipate, dialkyl phthalate such as diethyl phthalate, diallyl maleate, diallyl fumarate, divinyl ether of ethylene glycol, ethylene glycol dimethacrylate, propylene glycol dimethacrylate, 1,3-butylene glycol dimethacrylate, 1,4-butylene glycol dimethacrylate, ethylene glycol diacrylate, propylene glycol diacrylate, 1,3-butylene glycol diacrylate, 1,4-butylene glycol diacrylate, divinyl benzene, trivinyl benzene, and the like.

Upon completion of the polymerization of the core, that is, upon substantial exhaustion of the monomers in the core polymerization mix, the soft stage is then formed by polymerization at the surface of the core phase. The soft stage comprises from about 40 to about 80 parts of the multi-stage polymer and preferably from about 60 to about 80 parts.

The soft stage is prepared from a monomer such as an alkyl acrylate having from 1 to about 8 carbon atoms in the alkyl portion and the like.

The monomers used to prepare the soft stage include ethyl acrylate, n-butyl acrylate, 2-ethylhexyl acrylate, isobutyl acrylate and the like.

The soft stage may be prepared using a single monomer system or a comonomer system. If a comonomer is to be present, then such comonomer may be present in an amount of up to about 50% of the weight of the soft stage. The comonomer which may be present is a non-crosslinking vinylidene monomer such as acrylonitrile, alkyl methacrylates having from about 1 to about 8 carbon atoms in the alkyl portion such as methyl methacrylate, ethyl methacrylate, isopropyl methacrylate, t-butyl methacrylate, styrenics such as styrene or any of the styrenics set forth in connection with the styreneic materials which may be used for preparation of the core, isobornyl methacrylate, isoprene, chloroprene and the like.

Although the comonomer used to prepare the soft stage may comprise up to about 50% of the soft stage, it is preferred that such comonomers consist of up to about 25% of the soft stage.

The soft stage may be prepared using a crosslinking and a graftlinking agent. The graftlinking agent which is used is a polyethylenically unsaturated monomer which has a plurality of addition polymerizable reactive groups, at least one of which polymerizes at a substantially different rate of polymerization from at least one other of the reactive groups.

Among the graftlinking monomers which may be used in the present invention are allyl methacrylate, allyl acrylate, allyl, methallyl and crotyl esters of acrylic acid, methacrylic acid, maleic acid (mono- and di-esters); fumaric acid (mono- and di-esters) and itaconic acid (mono- and di-esters); allyl, methallyl and crotyl vinyl thioether; N-allyl, methallyl or crotyl maleamide; vinyl ester of 3-butenoic and 4-pentenoic acid, triallyl cyanurate; O-allyl, methallyl or crotyl O-alkyl, aryl, alkaryl or aralkyl, p-vinyl, aryl, or methallyl phosphonate, triallyl, trimethallyl or tricrotyl phosphate; O-vinyl, O,O-diallyl, dimethallyl or dicrotyl phosphate cyclo alkenyl esters of acrylic acid, methacrylic acid, maleic acid (mono and di-esters), fumaric acid (mono and di-esters), itaconic acid (mono and di-esters), such as 2,3, or 4 cyclohexenol acrylate, bicyclo(2,2,1)hept-5-ene-2-yl esters of acrylic acid, methacrylic acid, maleic acid (mono or di-esters), fumaric acid (mono and di-esters), and itaconic acid (mono and di-esters); vinyl ethers and vinyl thioethers of cycloalkanols and cycloalkene thiols such as vinyl cyclohex-4-ene-1-ylether, vinyl ether of bicyclo(2,2,1)hept-5 ene-2-Ol, vinyl esters of cyclo alkene carboxylic acid or vinyl bicyclo(2,2,1)hept-5 ene-2-carboxylate, diallyl maleate, and the like.

Crosslinking agents for the soft stage include trimethylol propane tri-acrylate, the divinyl esters of di- or tri-basic acids, such as divinyl adipate; dialkyl esters of polyfunctional acids such as dialkyl phthalate, diallyl esters such as diallyl maleate or diallyl fumarate, divinyl ethers of polyhydric alcohols such as the divinyl ether of ethylene glycol; and di- and tri-methacrylate and acrylic esters of polyhydric alcohols for example, trimethylol propane triacrylate and trimethacrylate, ethylene glycol dimethacrylate, propylene glycol dimethacrylate, 1,3-butylene glycol dimethacrylate, 1,4-butylene glycol dimethacrylate, ethylene glycol diacrylate, 1,2- or 1,3-propylene glycol diacrylate, and 1,3- and 1,4-butylene glycol diacrylate, and the like.

The crosslinker and the graftlinker may be present, individually, in an amount of from about 0.1 to about 10% based on the weight of the soft stage and preferably may be present in an amount of from about 0.1 to about 5%.

The outer stage is polymerized in the presence of the core and the soft stage, which itself has been polymerized in the presence of the core. Although stages in addition to the core and the soft stage may be provided prior to the final rigid outer stage, the outer stage and any intermediate stages, subsequent to the soft stage, constitute the balance of the multi-stage polymer.

The hard outer stage is polymerized from a monomer or monomer mixture which will result in a rigid, hard outer stage. Among the monomers which may be used are alkyl methacrylates having from 1 to about 8 carbons in the alkyl portion thereof, styrene, substituted styrene, acrylonitrile, methacrylonitrile, and mixtures thereof and the like.

Among the specific monomers which may be used to prepare the final stage are methyl methacrylate, ethyl methacrylate, isopropyl methacrylate, t-butyl methacrylate, acrylonitrile, isobornyl methacrylate, and the like.

The outer stage may contain a graftlinking or crosslinking agent, if desired, and such graftlinking or crosslinking agent, if used, may be the same as the graftlinking or crosslinking agents set forth in connection with the preparation of the soft stage.

As aforesaid, the weight of the intermediate stage, if present, and the outer stage will constitute the balance of the multi-stage polymer. One or more intermediate stages may be present and such intermediate stages may be either hard stages or soft stages or combinations thereof.

If an intermediate stage is to be present, it is preferred that the intermediate stage be polymerized from a styrenic material. The styrenic materials which may be used are the same styrenic materials set forth in connection with the styrenic materials which may be polymerized to form the core.

If a styrenic intermediate stage is to be present, such styrenic intermediate stage may be crosslinked, in the same manner as is the styrenic core and the amount of crosslinker which may be used is the same amount as is used for crosslinking the styrenic core.

If a styrenic intermediate stage is present, then it is preferred that the core comprise from about 10 to about 30 parts by weight, based on the weight of the multi-stage polymer and the styrenic intermediate stage may constitute up to 20 weight percent, based on the weight of the multi-stage polymer.

Other monomers may also be used to form an intermediate stage. These other monomers may be such as to form either an intermediate soft stage or an intermediate hard stage. Such other monomers will be apparent to one skilled in the art and may include the monomers set forth herein for formation of a soft stage or a hard stage.

The amount of pigment used in the composition may vary from about 0.1 part by weight per 100 parts of resin (polyester and/or polycarbonate) to about 30 parts by weight per 100 parts of resin. Generally, the amount of pigment used will be from about 2 to about 15 parts by weight, per hundred parts of resin.

Any pigment may be used which is compatible with a polyester and/or polycarbonate. Among the pigments which may be used are iron oxide reds and browns; cadmium and mercury sulfides; chromates, molybdates, aluminates and titanates; carbon black; organic pigments such as benzenoid pigments and the like. Other pigments will be apparent to one skilled in the art.

The pigment may be added to the multi-stage polymer, after its formation and may then be compounded with the polycarbonate and/or polyester resin. Alternatively, the polyester and/or polycarbonate resin may already contain the pigment prior to being compounded with the multi-stage polymer. Further, the resin, pigment and multi-stage polymer may be compounded simultaneously.

The pigmented polycarbonate and/or polyester resins generally will comprise from about 60 parts to about 99.9 parts, by weight, of the entire composition and preferably from about 75 to about 98 parts by weight.

Any thermoplastic polycarbonate may be used for the present invention. Such polycarbonates include, generally, bisphenol A derived polycarbonates and, specifically, the polycarbonate of 2,2-(4,4'-dihydroxy-diphenyl)propane, polycarbonates of di(monohydroxyphenyl)-substituted aliphatic hydrocarbons, in which both hydroxy-phenyl groups are attached to the same carbon atom of the hydrocarbon such as the polycarbonates of (4,4'-dihydroxy-diphenyl)-methane; 1,1-(4,4'-dihydroxy-diphenyl)-cyclohexane; 2,2-(4,4'-dihydroxy-diphenyl)-butane; 2,2-(4,4'-dihydroxy-diphenyl)-pentane; 2,2-(4,4'-dihydroxy-diphenyl)-hexane; and 2,2-(4,4'-dihydroxy-diphenyl)-heptane. Other polycarbonates which may be used are those which are produced by reacting dihydric phenols such as resorcinol, hydroquinone or dihydroxy diphenylene; in particular, bis-(hydroxyphenyl)-alkanes such as bis-(4-hydroxyphenyl)-2,2-propane (bisphenol A) or bis-(4,hydroxyphenyl)-3,5-dimethylphenyl)-2,2-propane. Additional polycarbonates which may be used are those derived from trinulcear bisphenols such as alpha, alpha'-bis-(4-hydroxyphenyl)-p-diisopropylbenzene; halogenated bis-(hydroxyphenyl)-alkanes; bis-(hydroxyphenyl)-cycloalkanes, alkanes, sulphones, -sulphoxides, -ethers or -sulfides optionally in admixture with glycols; with derivatives of carbonic acid, for example its diesters or dihalides and also optionally in conjunction with lesser quantities of dicarboxylic acids or derivatives thereof suitable for ester formation and the like. Other polycarbonates are well known to one skilled in the art.

The polyester used for the composition of this invention is a polyester having chain units containing an aromatic ring in the main chain of the polymer. The aromatic ring may, optionally, be a substituted aromatic ring. Examples of the substituent for the aromatic ring are halogen atoms such as chlorine or bromine, $C_1$–$C_8$ alkyl groups such as a methyl, ethyl, butyl, 2-ethylhexyl, or tertiary isobutyl group may be present. The polyesters may be obtained by reacting an aromatic dicarboxylic acid or ester-forming derivative thereof with glycol in a known manner. Such reactions are generally referred to as direct esterification or as ester interchange reactions.

The acid component of the polyester may be one such as naphthalene-2,6-dicarboxylic acid and terephthalic acid which may have a substituent, for example those set forth above as well as ester-forming derivatives thereof, such as the lower alkyl esters. The glycols may be polymethylene glycols having 2 to 8 carbon atoms such as 1,4-butanediol and 1,6-heptanediol. A portion of the acid component and/or the glycol component may be replaced by other acids or other ester-forming derivatives thereof. For example, other acid components may be isophthalic acid, p-hydroxybenzoic acid, adipic acid, sebacic acid, naphthalene dicarboxylic acids other than the naphthalene-2,6-dicarboxylic acid, and ester forming derivatives thereof. Examples of other glycol components which may be used are 1,4-cyclohexanediol, bisphenol A and ester-forming derivatives thereof. If a portion of the acid component and/or the glycol component is replaced by other acids or ester-forming derivatives, then it is preferred that such replacement be in an amount of up to about 30 mole percent.

Examples of specific polyesters which are used in this invention are, the poly($C_1$ to about $C_8$)alkylene terephthalates such as polyethylene terephthalate, polytetramethylene terephthalate, polyhexamethylene terephthalate, polyethylene-2,6-naphthalate, polytetramethylene-2,6-naphthalate, polyhexamethylene-2,6-naphthalate, polypropylene terephthalate, polybutylene terephthalate, polycyclohexene terephthalate, polyethylhexyl terephthalate, and the like.

A particularly preferred resin composition is a mixture of polycarbonate resin and polyester resin in equal weight amounts.

The multi-stage polymer of the present invention may be prepared in any known manner. Such preparations are well known to those skilled in the art.

Briefly, the multi-stage, sequentially produced polymers may be prepared by emulsion polymerizing the monomers used to prepare the core or by emulsion polymerizing the soft stage as well as subsequent stages, in the presence of a previously formed polymeric core. The polymerizations are accomplished in the presence of a catalyst and such polymerizations may include a polymerization regulator which serves as a chain transfer agent.

The emulsifier utilized will control the particle size of those stages subsequent to polymerization of the core. The soaps which may be used in emulsion polymerization are preferably used in the minimum amount necessary to give the desired result and the resultant multi-stage polymer may be isolated by coagulation or by spray drying.

The multi-stage sequential polymerization may be accomplished at a temperature of from about 0° C. to about 125° C. and preferably from about 30° C. to about 95° C.

A chain transfer agent may also be present during the polymerization to control the molecular weight of the stages.

The final particle size of the sequentially produced polymer may vary from about 150 to about 500 nanometers and preferably from about 200 to about 450 nanometers.

Other components may be added to the compositions after polymerization such as, for example, light stabilizers or oxidation inhibitors. Additional components are well known and will be apparent to one skilled in the art.

Blending of the multi-stage polymer and the polyester and/or polycarbonate resin may be accomplished in any known manner.

The multi-stage polymer and the polyester and/or polycarbonate can be milled to form a well dispersed mixture in an extruder, a roll mill or like equipment to prepare a molding composition.

In a particularly preferred blending method, the polycarbonate and/or polyester are dried at a temperature of from about 105° C. to about 120° C. for a period of time of from about 12 to about 20 hours. The polyester and/or polycarbonate is then blended with pigment. The multi-stage polymer is then blended with the pigmented polyester and/or polycarbonate resin using, for example, a one inch single screw extruder at a screw speed of from about 40 to about 80 revolutions per minute and a temperature, within the extruder, of from about 430° F. to about 500° F. The compounded pellets are then redried using the drying conditions set forth above. The dried, compounded pellets may then be injection molded or molded using another molding method well known to the art.

In the Examples which follow, the multi-stage polymers are prepared by means of sequential emulsion polymerization in the aforedescribed manner.

GENERAL PROCEDURE

The materials used in compounding the components of the Examples are Merlon M-50, a polycarbonate having an intrinsic viscosity of 1.5 and commercially available from Mobay Chemical Corporation; Celanex 2002-2, a poly(butylene terephthalate) having an intrinsic viscosity of 1.0 and commercially available from Celanese Corporation; Carodel PET 5-822C, a poly(ethylene terephthalate) having an intrinsic viscosity of 0.8 and obtained from Rohm and Haas Company; and red pigment C-PES-589, a blend of 71.2% by weight of a polymeric carrier, 3.4% of an organic red pigment, 2.5 percent of an inorganic dispersant and 22.9% of an inorganic red pigment, obtained from Reed Plastics Corporation.

The blending of the pigment, polyester and/or polycarbonate is accomplished in the following manner. Prior to the mixing of the red pigment with the polycarbonate and/or polyester, the resins are dried at 110° C. for approximately 16 hours. The dried pellets are then combined and mixed with the red pigment and multi-stage polymer, when present as part of the composition. The compounding is accomplished in a one inch Killion single screw extruder at a temperature of from 450° F. to 480° F. and a screw speed of 50 revolutions per minute. The compounded pellets are then redried using the conditions specified above. The compounding of the compositions is the same regardless of whether the multi-stage polymer is present and regardless of whether only a polycarbonate or only a polyester is present.

For the tests set forth in the Examples, the compounded resin compositions are injection molded on an Egan Auto Molder at a temperature of 525° F., a screw speed of 50 revolutions per minute, a ram time of 8 seconds, and an injection pressure of 800 psi and a mold temperature of from 144° F. to 197° F. The injection molded test pieces which are made are double gated plaques measuring 6 inches by 4 inches by ⅛ inch.

In the Examples which follow, the notched izod impact tests are determined on a ⅛ inch thick sample at 0° C., 10° C., and 23° C. Notched izod is determined according to ASTM Method D-256.

The instrumented vertical height impact tests (VHIT) is determined on a Dynatup machine available from General Research Corporation. This test measures the energy required to produce at least a crack in a ⅛ inch thick specimen sample. The test involves dropping a hemispherical dart, at a speed of 10 feet per second, onto the sample which is suspended between two clamps on a platform.

Color appearance of the sample is determined visually for intensity of color and the presence or absence of pearlescence.

In order to more fully illustrate the nature of this invention and the manner of practicing the same, the following Examples are presented.

EXAMPLES

In the Examples which follow, the following abbreviations have the following meanings.
PC=polycarbonate
PBT=poly(butylene terephthalate)
PET=poly(ethylene terephthalate)
RP=red pigment
BA=n-butyl acrylate
TMPTA=trimethylol propane triacrylate
DALM=diallyl maleate
MMA=methylmethacrylate
S=styrene
DVB=divinyl benzene A single slash is used to distinguish between the components of a single stage and a double slash is used to denote that a different stage commences after the double slash.

In the Examples which follow, it will be apparent that compositions of this invention have substantially the same impact strength as the comparative compositions. It will also be apparent that the intensity of color and absence of pearlescence obtained with compositions of the present invention is greatly improved over the comparative compositions. The pigmented compositions of this invention are inherently all non-transparent and non-translucent.

| Ex. | S/ | DVB// | BA/ | TMPTA/ | DALM// | MMA | | |
|---|---|---|---|---|---|---|---|---|
| | | | | MULTI-STAGE COMPOSITIONS USED IN THE INVENTION | | | | |
| 1 | 17.15/ | 0.35// | 64.0/ | 0.65/ | 0.35// | 17.5 | | |
| 2 | 17.15/ | 0.35// | 64.35/ | 0.325/ | 0.325// | 17.5 | | |

| Ex. | S/ | DVB// | BA/ | TMPTA/ | DALM// | S/ | DVB// | MMA |
|---|---|---|---|---|---|---|---|---|
| 3 | 4.9/ | 0.1// | 64.35/ | 0.325/ | 0.325// | 12.25/ | 0.25// | 17.5 |
| 4 | 9.8/ | 0.2// | 64.35/ | 0.325/ | 0.325// | 7.35/ | 0.15// | 17.5 |
| 5 | 17.15/ | 0.35// | 64.0/ | 0.65/ | 0.35// | 0.0/ | 0.0// | 17.5 |
| 6 | 17.15/ | 0.35// | 64.0/ | 0.65/ | 0.35// | 0.0/ | 0.0// | 17.5 |
| 7 | 17.15/ | 0.35// | 64.0/ | 0.65/ | 0.35// | 0.0/ | 0.0// | 17.5 |

| Ex. | S/ | DVB// | BA/ | TMPTA/ | DALM// | MMA |
|---|---|---|---|---|---|---|
| 8 | 4.9/ | 0.1// | 76.72/ | 0.39/ | 0.39// | 17.5 |
| 9 | 9.8/ | 0.2// | 71.78/ | 0.36/ | 0.36// | 17.5 |
| 10 | 14.7/ | 0.3// | 66.82/ | 0.34/ | 0.34// | 17.5 |
| 11 | 19.6/ | 0.4// | 61.88/ | 0.31/ | 0.31// | 17.5 |
| 12 | 24.5/ | 0.5// | 56.92/ | 0.29/ | 0.29// | 17.5 |
| 13 | 39.2/ | 0.8// | 42.08/ | 0.21/ | 0.21// | 17.5 |
| 14 | 17.5/ | 0.00175// | 64.0/ | 0.65/ | 0.35// | 17.5 |
| 15 | 17.5 | 0.0175// | 64.0/ | 0.65/ | 0.35// | 17.5 |
| 16 | 17.4/ | 0.0875// | 64.0/ | 0.65/ | 0.35// | 17.5 |

| Ex. | S/ | DVB/ | MMA// | BA/ | TMPTA/ | DALM// | MMA |
|---|---|---|---|---|---|---|---|
| 17 | 17.15/ | 0.35/ | 3.5// | 60.57/ | 0.62/ | 0.31// | 17.5 |
| 18 | 17.15/ | 0.35/ | 0.0// | 64.0/ | 0.65/ | 0.35// | 17.5 |

| | | CONTROL COMPOSITIONS USED FOR COMPARATIVE PURPOSES | | |
|---|---|---|---|---|
| Control | Resin and Ratio | Multistage Polymer and Amounts Used (Parts per hundred Parts of Resin) | Amount of Pigment Used (Parts/Hundred Parts of Resin) | Control Used For Comparison With Ex. No. |
| A | PC-50 + PBT-50 | None | None | 1–18 |
| B | PC-50 + PBT-50 | None | 2.0 | 1–18 |
| C | PC-50 + PET-50 | None | None | 1–18 |
| D | PC-50 + PET-50 | None | 2.0 | 1–18 |
| E | PC-50 + PBT-50 | BA/TMPTA/DALM//MMA 6 and 12 79.12/0.4/0.48//20.0 | 2.0 | 1–4 |
| F | PC-100 | BA/TMPTA/DALM//MMA | 2.0 | 5 |

-continued

| | | 12 | | |
|---|---|---|---|---|
| | | 79.12/0.4/0.48//20.0 | | |
| G | PBT-100 | Same as F | 2.0 | 5 |
| | | 12 | | |
| H | PET-100 | Same as F | 2.0 | 5 |
| | | 12 | | |
| I | PC-75 + PBT-25 | Same as F 12 | 2.0 | 6 |
| J | PC-75 + PET-25 | Same as F 12 | 2.0 | 6 |
| K | PC-25 + PBT-75 | Same as F 12 | 2.0 | 7 |
| L | PC-50 + PBT-50 | Same as F 12 | 2.0 | 17–18 |
| M | PC-50 + PBT-50 | BA/TMPTA/DALM//S//MMA 6 and 12 64.35/0.325/0.325//17.5//17.5 | 2.0 | 1–18 |
| N | PC-50 + PBT-50 | BA/TMPTA/DALM//S/DVB//MMA/TMPTA 6 and 12 64.35/0.325/0.325//17.15//0.35//17.5/0.0175 | 2.0 | 1–18 |
| O | PC-50 + PBT-50 | S//BA/TMPTA/DALM//MMA 6 and 12 17.5//64.35/0.325/0.325//17.5 | 2.0 | 1–18 |
| P | PC-50 + PBT-50 | S//BA/TMPTA/DALM//S//MMA 6 and 12 10.0//64.35/0.325/0.325//7.5//17.5 | 2.0 | 1–18 |
| Q | PC-50 + PBT-50 | MMA//BA/TMPTA/DALM//MMA 6 and 12 17.5//64.35/0.325/0.325//17.5 | 2.0 | 1–18 |
| R | PC-50 + PBT-50 | MMA/TMPTA//BA/TMPTA/DALM//MMA 6 and 12 17.5/0.0175//64.35/0.325/0.325//17.5 | 2.0 | 1–18 |

EXAMPLES 1–4

Each of the compositions of Examples 1 through 4 and control E are compounded, with 50 parts of polycarbonate (Merlon M-50) plus 50 parts of poly(butylene terephthalate) (Celanex 2002-2) and 2.0 parts of red pigment (C-PES-589) on the one inch Killion single screw extruder, as described in the "General Procedure" and are then injection molded as described earlier. The impact strength of each molded sample is determined and the color characteristics of each sample are observed. The results are set forth in Table 1.

TABLE I

| Example No. | Parts of Multi-Stage Polymer/100 Parts of Resin | Notched Izod Impact (ft.-lbs./in.) | | | Dynatup Impact at 23° C. (in.-lbs.) | Color of Molded Sample |
|---|---|---|---|---|---|---|
| | | 23° C. | 10° C. | 0° C. | | |
| 1 | 6 | 6.2 | 2.2 | 1.6 | 600 | For both samples - no pearlescence seen. Marked reduction in the prominence of the weld lines compared to Control E. Uniform and intense color. |
| 1 | 12 | 15.0 | 6.3 | 3.1 | 550 | |
| 2 | 6 | 3.5 | 2.3 | 1.9 | 600 | For both samples - slight pearlescence seen at the gates of the molded article. Marked reduction in the prominence of the weld line compared to Control E. Uniform deep color. |
| 2 | 12 | 13.7 | 8.1 | 3.4 | 610 | |
| 3 | 6 | 2.9 | 2.5 | 1.9 | 610 | For both samples - slight pearlescence seen at the gates of the molded sample. Marked reduction in the prominence of the weld line compared to Control E. Improvement in the uniformity and depth of color compared to Control E. |
| 3 | 12 | 13.4 | 8.2 | 3.4 | 600 | |
| 4 | 6 | 7.7 | 2.6 | 2.1 | 600 | For both samples - very slight pearlescence at the gates of the molded sample. Marked reduction in the prominence of the weld line compared to Control E. Uniform deep color superior to the color obtained in Control E. |
| 4 | 12 | 14.0 | 8.1 | 3.4 | 600 | |
| Control E | 6 | 7.9 | 2.9 | 2.5 | 570 | For both samples - pearlescence at both entrance gates. Weld lines appear very prominent. Color is non-uniform and not |
| Control E | 12 | 15.7 | 8.6 | 3.4 | 600 | |

TABLE I-continued

| Example No. | Parts of Multi-Stage Polymer/100 Parts of Resin | Notched Izod Impact (ft.-lbs./in.) 23° C. | 10° C. | 0° C. | Dynatup Impact at 23° C. (in.-lbs.) | Color of Molded Sample |
|---|---|---|---|---|---|---|
| | | | | | | very intense. |

Table I demonstrates the efficacy of compositions according to this invention in improving uniformity of color, depth of color and in eliminating or substantially reducing pearlescence.

In order to establish that compounded non-impact modified blends of polycarbonate and polyester have poor impact resistance but good color characteristics, the data of Table II is presented. In Table II, Controls A and C had no pigment and Controls B and D both had the red pigment specified in this example.

EXAMPLES 5-7

Examples 5 through 7 demonstrate the efficacy of the compositions of this invention when the resin is 100 parts of polycarbonate or poly(butylene terephthalate) or poly(ethylene terephthalate).

The procedure of Examples 1 through 4 are repeated except that the resin used, or blend thereof, is as indicated in Table III. The pigment used, and amount thereof, is the same as is set forth in Examples 1-4. The results are set forth in Table III.

TABLE II

| Example No. | Parts of Multi-Stage Polymer/100 Parts of Resin | Notched Izod Impact (ft.-lbs./in.) 23° C. | 10° C. | 0° C. | Dynatup Impact at 23° C. (in.-lbs.) | Color of Molded Sample |
|---|---|---|---|---|---|---|
| Control A | None | 1.4 | 1.2 | 1.1 | 550 | Controls A and C are non-pigmented and no observations could be made concerning color. |
| Control C | None | 0.97 | 0.70 | 0.65 | 660 | |
| Control B | None | 1.5 | 1.2 | 1.1 | | For Controls B and D, no pearlescence is observed at the entrance gates. The weld line is barely seen and the color is intense and uniform. |
| Control D | None | 0.95 | 0.80 | 0.55 | 610 | |

TABLE III

| Example No. | Resin Used and Amount (Parts) | Parts of Multi-Stage Polymer/100 Parts of Resin | Notched Izod Impact (ft.-lbs./in.) 23° C. | 10° C. | 0° C. | Dynatup Impact at 23° C. (in.-lbs.) | Color of Molded Sample |
|---|---|---|---|---|---|---|---|
| 5 | PC-100 | 12 | 14.8 | 14.0 | 14.8 | 510 | Very slight pearlescence at the gates of the molded sample. Weld lines barely seen. Uniform intense color. |
| 5 | PBT-100 | 12 | 1.2 | 0.8 | 0.9 | 590 | Very slight pearlescence at the gates of the molded sample. Weld lines not seen. Uniform intense color. |
| 5 | PET-100 | 12 | 1.4 | 0.9 | 0.6 | 570 | No pearlescence. Weld line barely seen. Uniform intense color. |
| Control F | PC-100 | 12 | 14.0 | 14.0 | 13.0 | 490 | Pronounced pearlescence at and near the gates of the molded sample. Prominent weld line seen. Non-uniform color of reduced intensity. |
| Control G | PBT-100 | 12 | 1.1 | 1.2 | 1.3 | 620 | Slight pearlescence at the gates of the molded sample. Slight weld line seen. Non-uniform color of reduced intensity. |
| Control H | PET-100 | 12 | 1.5 | 1.1 | 0.8 | 560 | Slight pearlescence at the gates of the molded sample. Weld line more prominent than in Example 5 (PET-100). Overall uniform color of reduced intensity compared to Example 5 (PET-100). |
| 6 | PC-75 + PBT-25 | 12 | 14.7 | 12.1 | 11.1 | 480 | Slight pearlescence at the gates of the molded sample. Weld line barely seen. Color is uniform and intense. |
| 6 | PC-75 + PET-5 | 12 | 15.2 | 15.6 | 11.5 | 520 | No pearlescence. Weld line barely seen. Color is intense and uniform. |
| Control I | PC-75 + PBT-25 | 12 | 14.0 | 12.5 | 10.1 | 510 | Pronounced pearlescence at the gates of the molded sample. Weld lines very prominent. Patchy color of diminished intensity. |
| Control J | PC-75 + PET-25 | 12 | 15.9 | 16.6 | 12.7 | 570 | Pronounced pearlescence at the gates of the molded sample. Weld line very prominent. Patchy color of diminished |

TABLE III-continued

| Example No. | Resin Used and Amount (Parts) | Parts of Multi-Stage Polymer/100 Parts of Resin | Notched Izod Impact (ft.-lbs./in.) | | | Dynatup Impact at 23° C. (in.-lbs.) | Color of Molded Sample |
| --- | --- | --- | --- | --- | --- | --- | --- |
| | | | 23° C. | 10° C. | 0° C. | | |
| 7 | PC-25 + PBT-75 | 12 | 2.2 | 2.0 | 1.8 | 610 | intensity. Very slight pearlescence at the gates of the molded sample. Weld line not seen. Color is intense and uniform. |
| Control K | PC-25 + PBT-75 | 12 | 2.2 | 2.3 | 1.8 | 620 | Pearlescence at the gate of the molded sample. Prominent weld line. Color of reduced intensity compared to Example 7. |

EXAMPLES 8–13

Examples 8 through 13 illustrate the efficacy of this invention using different levels of styrene in the core of the multi-stage polymer.

The procedure of Examples 1 through 4 is repeated several times. The polycarbonate and poly(butylene terephthalate) and the amounts thereof as well as the pigment and amounts thereof, used in Examples 1 through 4 are used in these examples 8 through 13. Compounding is accomplished in the manner of Examples 1 through 4. The results are set forth in Table IV.

EXAMPLES 14–16

Examples 14 through 16 demonstrate the efficacy of the present invention using different levels of crosslinker in the styrene core.

The procedure of Examples 8 through 13 is repeated. The results are set forth in Table V.

TABLE V

| Example No. | Parts of Multi-Stage Polymer/100 Parts of Resin | Notched Izod Impact (ft.-lbs./in.) | | | Dynatup Impact at 23° C. (in.-lbs.) | Color of Molded Sample |
| --- | --- | --- | --- | --- | --- | --- |
| | | 23° C. | 10° C. | 0° C. | | |
| 14 | 12 | 12.6 | 6.1 | 3.1 | 610 | Pearlescence at the gates of the molded sample. Weld line clearly seen. Color is not very intense. |
| 15 | 12 | 12.8 | 7.9 | 3.0 | 600 | Slight Pearlescence at the gates of the molded sample. Weld line is prominent. Color is more intense than in example 14. |
| 16 | 12 | 12.8 | 4.5 | 3.1 | 560 | Very slight pearlescence at the gates of the molded sample. Weld line not very prominent. Color is intense and uniform. |

EXAMPLES 17–18

Example 17 illustrates the use of a non-styrenic copolymer as part of the core. Example 18 is a composition according to this invention. The results are presented in Table VI.

TABLE IV

| Example No. | Parts of Multi-Stage Polymer/100 Parts of Resin | Notched Izod Impact (ft.-lbs./in.) | | | Dynatup Impact at 23° C. (in.-lbs.) | Color of Molded Sample |
| --- | --- | --- | --- | --- | --- | --- |
| | | 23° C. | 10° C. | 0° C. | | |
| 8 | 12 | 13.7 | 6.9 | 5.0 | 540 | Pearlescence seen at and near the gates. Weld line prominent. Color not intense. |
| 9 | 12 | 12.8 | 7.8 | 4.1 | 610 | Slight pearlescence seen at the gates of the molded sample. Weld line clearly seen. Color more intense than in example 8. |
| 10 | 12 | 12.5 | 5.9 | 3.3 | 570 | Very slight pearlescence. Weld line barely perceptive. Color is more intense than in example 9. |
| 11 | 12 | 12.2 | 5.5 | 3.2 | 630 | Same as for example 10. |
| 12 | 12 | 12.2 | 5.4 | 2.8 | 560 | Very little pearlescence. Weld line barely seen. Color more intense than in example 10. |
| 13 | 12 | 4.1 | 2.3 | 1.8 | 610 | Pearlescence barely perceptible. Weld line barely perceptible. Color very intense and uniform and more intense than in example 12. |

TABLE VI

| Example No. | Parts of Multi-Stage Polymer/100 Parts of Resin | Notched Izod Impact (ft.-lbs./in.) 23° C. | 10° C. | 0° C. | Dynatup Impact at 23° C. (in.-lbs.) | Color of Molded Sample |
|---|---|---|---|---|---|---|
| 17 | 12 | 12.8 | 4.5 | 2.9 | 600 | Very slight pearlescence at the gates of the molded sample. Weld line barely seen. Color is intense and uniform. |
| 18 | 12 | 15.0 | 6.3 | 3.1 | 550 | No pearlescence seen. Weld line barely seen. Color is intense and uniform |
| Control L | 12.0 | 15.7 | 8.6 | 3.4 | 600 | Pearlescence at both entrance gates. Weld line appears very prominent. Color is non-uniform and not very intense. |

EXAMPLES 19-22

Example 19 demonstrates that despite the presence of styrene as a non-core stage in the multistage polymer, and the absence of styrene in the core, the benefits of this invention are not obtained. Example 20 demonstrates that despite the presence of a crosslinked styrene as a non-core stage in the multi-stage polymer, the benefits of this invention are not obtained. Example 21 demonstrates that the benefits of the present invention are not obtained when non-crosslinked styrene constitutes the core of the multistage polymer. Example 22 demonstrates that when non-crosslinked styrene constitutes the core of the multistage polymer, despite the presence of an additional non-core styrene stage, the benefits of the invention are not obtained.

The procedure of Examples 8-13 are repeated. The results are set forth in Table VII.

TABLE VII

| Example | Parts of Multi-Stage Polymer/100 Parts of Resin | Notched Izod Impact (ft.-lbs./in.) 23° C. | 10° C. | 0° C. | Dynatup Impact at 23° C. (in.-lbs.) | Color of Molded Samples |
|---|---|---|---|---|---|---|
| 19 (Control M) | 6 | 3.2 | 2.1 | 1.8 | 560 | For both samples - pearlescence observed at entrance gates and weld-line areas. The weld-lines are prominent. The color intensity is non-uniform. |
| 19 (Control M) | 12 | 14.2 | 3.3 | 2.4 | 540 | |
| 20 (Control N) | 6 | 3.2 | 2.6 | 2.1 | 570 | For both samples - pearlescence was seen over both entire samples. The weld-lines appeared prominent. The color was not uniform and the color intensity was not as great as that obtained with controls B and D. |
| 20 (Control N) | 12 | 13.6 | 9.3 | 3.2 | 620 | |
| 21 (Control O) | 6 | 2.8 | 2.5 | 2.0 | 610 | For both samples - pearlescence over the entire samples. The weld-lines appear very prominent. The color is non-uniform. The color intensity is reduced compared to controls B and D. |
| 21 (Control O) | 12 | 13.2 | 6.3 | 2.8 | 610 | |
| 22 (Control P) | 6.0 | 2.9 | 2.4 | 2.0 | 600 | For both samples - pearlescence over the entire samples. Weld-lines are prominent. The color is non-uniform. The color intensity is reduced over that obtained in controls B and D. |
| 22 (Control P) | 12 | 12.4 | 8.1 | 2.9 | 600 | |

EXAMPLES 23-24

Example 23 (Control Q) demonstrates that when the core of the multi-stage polymer is polymerized from methylmethacrylate, a hard polymer, the benefits of this invention are not obtained. Example 24 (Control R) demonstrates that the benefits of this invention are not obtained when the core is prepared from crosslinked methylmethacrylate.

The procedure of Examples 8-13 are repeated. The results are set forth in Table VIII.

TABLE VIII

| Example | Parts of Multi-Stage Polymer/100 Parts of Resin | Notched Izod Impact (ft.-lbs./in.) 23° C. | 10° C. | 0° C. | Dynatup Impact at 23° C. (in.-lbs.) | Color Of Molded Samples |
|---|---|---|---|---|---|---|
| 23 (Control Q) | 6 | 2.9 | 2.2 | 1.9 | 570 | For both samples - pearlescence is very pronounced. The weld-lines are very prominent. The color is non-uniform and patchy. |
| 23 (Control Q) | 12 | 11.4 | 4.9 | 3.0 | 566 | |
| 24 (Control R) | 6 | 3.1 | 2.7 | 2.3 | 600 | For both samples - pearlescence is very pronounced. The weld-lines |

TABLE VIII-continued

| Example | Parts of Multi-Stage Polymer/100 Parts of Resin | Notched Izod Impact (ft.-lbs./in.) | | | Dynatup Impact at 23° C. (in.-lbs.) | Color Of Molded Samples |
| --- | --- | --- | --- | --- | --- | --- |
| | | 23° C. | 10° C. | 0° C. | | |
| 24 (Control R) | 12 | 13.4 | 6.5 | 3.4 | 610 | appear very prominent. Color is non-uniform and patchy. |

The sequentially produced multi-stage polymer which is part of this invention may also be used to alter the properties, such as impact resistance, processability, thermal stability and weatherability, and other properties of numerous polymers and polymer blends, both pigmented and non-pigmented. The amount of multi-stage polymer used with such other polymers and polymer blends may vary widely and may be used in the amounts set forth herein in connection with polyesters, polycarbonate and mixtures thereof or they may be used in lesser or greater amounts.

Among the polymers and polymer blends, with which the multi-stage polymer may be used are polyesters, such as those described herein, polycarbonates, and blends thereof; polyphenylene, polyphenylene oxide, and blends thereof; acrylonitrile-styrene-butadiene copolymers, alone or blended with polycarbonate and/or polyvinyl chloride homopolymer or copolymer as well as blends thereof and blends with polycarbonate; acrylic polymers such as polymers and copolymers of acrylic acid, methacrylic acid, alkyl acrylates, particularly those having one to twelve carbon atoms in the alkyl portion, alkyl methacrylates such as those having one to four carbon atoms in the alkyl portion and particularly methyl methacrylate; polybutadiene and copolymers thereof as well as blends thereof, particularly blends with alkyl acrylates; polyvinylhalides, such as polyvinylchloride, and copolymers thereof as well as modified polyvinylhalides which have been modified with one or more of known modifiers for polyvinylhalide such as methacrylate-butadiene-styrene copolymers with or without acrylonitrile as one of the copolymer components, chlorinated polyethylene, styrene, acrylate-styrene copolymers; polypropylene, polypropylene copolymers, polypropylene blended with polymers from ethylenepropylene diene monomers as well as homopolymers of the ethylene propylene diene monomers; polyvinylidene chloride and/or fluoride, polytetrafluoroethylene; polyetherimides and blends thereof; polyethylene homopolymers and copolymers alone or blended with polycarbonate or other polymer; styrene-maleic anhydride copolymers, alone or blended with a polyvinylhalide, e.g., polyvinylchloride, or blended with a polycarbonate or both; polyamides such as Nylon 6 or 66 or 11 or 12 and blends thereof as well as Nylon blended with a polymer from ethylene propylene diene monomer; polyacetal homopolymers and copolymers and blends thereof; styrene-acrylonitrile copolymers; blends of polyesters, such as blends of the polyesters set forth herein; and the like.

While this invention has been described in terms of certain preferred embodiments and illustrated by means of specific Examples, the invention is not to be construed as limited except as set forth in the following claims.

We claim:

1. A pigmented polymer blend comprising from about 60 parts to about 99.9 by weight of a pigmented, non-transparent, non-translucent thermoplastic resin wherein there is present from about 0.1 part by weight to about 30 parts by weight of pigment, per 100 parts of resin, said thermoplastic resin being selected from the class consisting of polyesters, polycarbonates and mixtures thereof, and from 0.1 part to about 40 parts of a sequentially produced multi-stage polymer comprising;
   (a) A polymer core of at least about 10 parts, based on the weight of the multi-stage polymer, said core being polymerized from a styrenic monomer or a mixture of a styrenic monomer and a second monomer which is a non-styrenic monovinylidene comonomer and wherein there is at least about 50 percent by weight of said styrenic monomer in said core said core being crosslinked;
   (b) A second stage comprising a polymeric soft stage polymerized from an alkyl acrylate monomer or a mixture of an alkyl acrylate and up to 50 percent of a non-crosslinking vinylidene comonomer, said soft stage being crosslinked and graftlinked; and
   (c) A rigid thermoplastic outer stage polymerized from at least one monovinylidene monomer.

2. A polymer blend according to claim 1 wherein said core is crosslinked with a crosslinker which is present in an amount of from about 0.1 to about 10 percent based on the weight of the core.

3. A polymer blend according to claim 2 wherein said crosslinker is selected from the class consisting of polyvinyl benzene, divinyl esters of di or tri-basic acids, dialkyl esters of polyfunctional acids, diallyl esters of polyfunctional acids, divinyl esters of polyhydric alcohols, di or tri methacrylic acid esters of polyhydric alcohols, di or tri acrylic acid esters of polyhydric alcohols, and mixtures thereof.

4. A polymer blend according to claim 2 wherein said crosslinker is selected from the class consisting of trimethylol propane triacrylate, divinyl adipate, dialkyl phthalate, diallyl maleate, diallyl fumarate, divinyl ether of ethylene glycol, ethylene glycol dimethacrylate, propylene glycol dimethacrylate, 1,3-butylene glycol dimethacrylate, 1,4-butylene glycol dimethacrylate, ethylene glycol diacrylate, propylene glycol diacrylate, 1,3-butylene glycol diacrylate, 1,4-butylene glycol diacrylate, divinyl benzene, trivinyl benzene, and mixtures thereof.

5. A polymer blend according to claim 1 wherein said styrenic monomer is selected from the class consisting of styrene, alpha-methyl styrene, monochlorostyrene, t-butylstyrene, vinyl toluene, p-isopropyl styrene, 3,4-dimethyl styrene, p-bromostyrene, 3,4-dichlorostyrene, and mixtures thereof.

6. A polymer blend according to claim 1 wherein at least one additional stage, intermediate said soft stage and said outer stage, is present.

7. A polymer blend according to claim 6 wherein said additional stage is polymerized from a styrenic monomer.

8. A polymer blend according to claim 6 wherein said additional stage is polymerized from a styrenic monomer and a crosslinker.

9. A polymer blend according to claim 1 wherein said second monomer is a non-styrenic non-crosslinking monovinylidene monomer.

10. A polymer blend according to claim 1 wherein said second monomer is an alkyl methacrylate.

11. A polymer blend according to claim 1 wherein said second monomer is a vinyl ester.

12. A polymer blend acording to claim 1 wherein said second monomer is acrylonitrile.

13. A polymer blend according to claim 1 wherein said second monomer is methacrylic acid.

14. A polymer blend according to claim 1 wherein said second monomer is acrylic acid.

15. A polymer blend according to claim 1 wherein said second monomer is an alkyl methacrylate having from 1 to about 8 carbon atoms in the alkyl portion.

16. A polymer blend according to claim 15 wherein said alkyl methacrylate is methyl methacrylate.

17. A polymer blend according to claim 1 wherein said second monomer is an alkyl acrylate having from 1 to about 8 carbon atoms in the alkyl portion.

18. A polymer blend according to claim 17 wherein said alkyl acrylate is selected from the class consisting of methyl acrylate, ethyl acrylate, propyl acrylate, butyl acrylate and mixtures thereof.

19. A polymer blend according to claim 1 wherein said second monomer is present in an amount of from about 1 percent to about 20 percent.

20. A polymer blend according to claim 2 wherein said crosslinker is present in an amount of from about 0.1 to about 5 percent based on the weight of the core.

21. A polymer blend according to claim 1 wherein said core comprises from about 10 to about 40 parts by weight, based on the weight of the multi-stage polymer.

22. A polymer blend according to claim 1 wherein said core comprises from about 10 to about 30 parts by weight, based on the weight of the multi-stage polymer, and an additional styrenic stage is present and is intermediate said soft stage and said outer stage.

23. A polymer blend according to claim 1 wherein said soft stage comprises from about 40 to about 80 parts by weight, based on the weight of the multi-stage polymer.

24. A polymer blend according to claim 1 wherein said soft stage comprises from about 60 to about 80 parts by weight, based on the weight of the multi-stage polymer.

25. A polymer blend according to claim 1 wherein said soft stage is polymerized from an alkyl acrylate monomer having from 1 to about 8 carbon atoms in the alkyl portion thereof.

26. A polymer blend according to claim 25 wherein said alkyl acrylate is selected from the class consisting of ethyl acrylate, n-butyl acrylate, 2-ethylhexyl acrylate and isobutyl acrylate.

27. A polymer blend according to claim 25 wherein there is present a crosslinker in an amount of from about 0.1 to about 10 percent based on the weight of the soft stage.

28. A polymer blend according to claim 25 wherein there is present a graftlinker in an amount of from 0.1 to about 10 percent based on the weight of the soft stage.

29. A polymer blend according to claim 1 wherein said soft stage contains from about 0.1 to about 10 percent of a crosslinker and from about 0.1 to about 10 percent of a graftlinker, both separately based on the weight of the soft stage.

30. A polymer blend according to claim 1 wherein said comonomer of said soft stage is selected from the class consisting of acrylonitrile, alkyl methacrylates having from 1 to about 8 carbon atoms in the alkyl portion, styrenics, isoprene, chloroprene, and mixtures thereof.

31. A polymer blend according to claim 1 wherein said outer stage is polymerized from a $C_1$ to about $C_8$ alkyl methacrylate.

32. A polymer blend according to claim 1 wherein said outer stage is polymerized from the class consisting of methyl methacrylate, ethyl methacrylate, isopropyl methacrylate, t-butyl methacrylate, acrylonitrile, isobornyl methacrylate, and mixtures thereof.

33. A polymer blend according to claim 1 wherein said outer stage comprises from about 10 to about 35 parts based on the weight of the multi-stage polymer.

34. A polymer blend according to claim 1 wherein said polyester is a poly($C_1$ to $C_8$)alkylene terephthalate.

35. A polymer blend according to claim 1 wherein said polyester is poly(butylene terephthalate).

36. A polymer blend according to claim 1 wherein said polycarbonate is an aromatic polycarbonate.

37. A polymer blend according to claim 1 wherein said polycarbonate is derived from bisphenol A.

38. A polymer blend according to claim 1 wherein said pigmented thermoplastic resin is a mixture of a polyester and a polycarbonate and a pigment.

39. A polymer blend according to claim 1 wherein said pigmented thermoplastic resin is a mixture of an aromatic polycarbonate and poly(butylene terephthalate) and a pigment.

40. A polymer blend according to claim 39 wherein there are about equal weight amounts of said aromatic polycarbonate and said poly(butylene terephthalate).

41. A polymer blend according to claim 1 wherein said pigment is present in an amount of from about 0.1 to about 15 parts by weight per 100 parts of thermoplastic resin.

42. A polymer blend according to claim 1 wherein said pigment is present in an amount of from about 2 to about 5 parts by weight per 100 parts of thermoplastic resin.

43. A polymer blend according to claim 1 wherein said polycarbonate is present in an amount of from about 25 percent to about 75 percent and said polyester is present in an amount of from about 75 percent to about 25 percent based on the total weight of non-pigmented thermoplastic resin.

44. In a process for enhancing the intensity of the color of a pigmented non-transparent and non-translucent thermoplastic polymer resin wherein said pigmented resin is present in an amount of from about 60 parts to about 99.9 parts by weight and said pigment is present in an amount of from about 0.1 part by weight to about 30 parts by weight, per 100 parts of resin, said thermoplastic resin being selected from the class consisting of polyesters, polycarbonates and mixtures thereof, and said resin contains an impact modifier, the improvement comprising blending with said resin, as the impact modifier, from 0.1 part to about 40 parts of a sequentially produced multi-stage polymer comprising;

(a) A polymer core of at least about 10 parts, based on the weight of the multi-stage polymer, said core being polymerized from a styrenic monomer or a mixture of a styrenic monomer and a second monomer which is a non-styrenic monovinylidene comonomer and wherein there is at least about 50 percent by weight of said styrenic monomer in said core said core being crosslinked;

(b) A second stage comprising a polymeric soft stage polymerized from an alkyl acrylate monomer or a mixture of an alkyl acrylate and up to 50 percent of a non-crosslinking vinylidene comonomer, said soft stage being crosslinked and graftlinked; and (c) A rigid thermoplastic outer stage polymerized from at least one monovinylidene monomer whereby the intensity of the color of said pigmented resin is enhanced while substantially maintaining the impact resistance of articles molded from said pigmented resin.

* * * * *